United States Patent
Agrawal et al.

(10) Patent No.: US 6,748,234 B1
(45) Date of Patent: Jun. 8, 2004

(54) METHOD AND APPARATUS FOR POWER CONTROL IN A WIRELESS COMMUNICATION SYSTEM

(75) Inventors: Avneesh Agrawal, San Jose, CA (US); Da-shan Shiu, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 519 days.

(21) Appl. No.: 09/718,316

(22) Filed: Nov. 21, 2000

(51) Int. Cl.$^7$ .................................................. H04B 7/00
(52) U.S. Cl. ...................... 455/522; 455/69; 455/67.11; 455/517; 455/419; 370/208; 370/210; 370/318; 370/328
(58) Field of Search ................... 455/522, 69, 517, 455/419, 67.1; 370/208, 210, 318, 328

(56) References Cited

U.S. PATENT DOCUMENTS

| | | | | |
|---|---|---|---|---|
| 6,154,659 | A | * 11/2000 | Jalali et al. | 455/522 |
| 6,249,683 | B1 | * 6/2001 | Lundby et al. | 455/522 |
| 6,337,989 | B1 | * 1/2002 | Agin | 455/522 |
| 6,411,608 | B2 | * 6/2002 | Sharony | 370/318 |
| 6,411,817 | B1 | * 6/2002 | Cheng et al. | 455/522 |
| 6,564,067 | B1 | * 5/2003 | Agin | 455/522 |

FOREIGN PATENT DOCUMENTS

| | | |
|---|---|---|
| EP | 1128578 | 11/1999 |
| EP | 1067704 | 6/2000 |
| WO | 9858461 | 12/1998 |
| WO | 0027050 | 11/2000 |

OTHER PUBLICATIONS

Lee et al., "Performance of Closed–Loop Power Control for a Multiple–Channel Mobile Station in the cdma2000 System", *IEEE Wireless Communications and Networking Conference*, vol. 2, XP–002168645, Sep. 21, 1999, pp 908–912.

* cited by examiner

Primary Examiner—Nay Maung
Assistant Examiner—Alan T. Gantt
(74) *Attorney, Agent, or Firm*—Philip R. Wadsworth; Sandra L. Godsey

(57) ABSTRACT

In a wireless communication system having a composite transport channel made up of individual transport channels, a method for closed loop power control wherein multiple instances of the outer loop are performed in parallel. The method determines a Signal-to-Interference Ratio (SIR) threshold for the composite channel based on a channel quality metric evaluated for each of the individual channels. In one embodiment the channel quality metric is a Cyclical Redundancy Check (CRC) outcome.

24 Claims, 6 Drawing Sheets

METHOD AND APPARATUS FOR POWER CONTROL IN A WIRELESS COMMUNICATION SYSTEM

FIELD

The present invention relates to wireless data communication. More particularly, the present invention relates to a novel and improved method and apparatus for power control in a wireless communication system.

BACKGROUND

In a wireless communication system, a base station communicates with multiple mobile users. The communication link from the base station to the mobile is referred to as the forward link, while the communication link from the mobile to the base station is referred to as the reverse link. In a Code Division Multiple Access (CDMA) system particularly, mobile users share a same Radio Frequency (RF) band wherein power control prevents one user from interfering with other mobiles. In one such system, power control is used to ensure sufficient quality of signals received at the base station or at the mobile. Specifically, in the reverse link, power control adjusts the transmit power of each mobile to achieve the effect that signals are centrally received by the base station at approximately the same power level. In other words, reverse link power control seeks to solve the "near-far" problem in spread spectrum multiple access systems and thus increase capacity of the system. In the forward link, power control can also be employed to prevent excessive downlink transmit power interfering with the downlink transmissions in the adjacent cells. Spread spectrum systems such as CDMA systems typically employ an open loop or a closed loop power control scheme. Open loop refers to transmitter (either mobile or base station)-controlled operation where the receiver is not directly involved. For example, a particular reverse link open loop power control calls for the mobile to adjust reverse link transmit power based on the power level of signals received from the base station via the forward link. Closed loop power control expands open loop operation whereby the receiver actively participates in making the power adjustment decision. For example, for reverse link closed loop power control the base station compares the power level of signals received from a given mobile to a threshold value. The base station then instructs the mobile to increase or decrease the reverse link transmit power based on the comparison. Conversely, the mobile monitors the power level of signals received on the forward link, and provides feedback on the quality of the forward link to the base station. Closed loop operation is used to compensate for power fluctuations associated with fading, such as Raleigh fading, of a given link.

For a system in which a mobile receives multiple data streams via a common link, a problem exists in distinguishing the quality of each of the transmitted signals. There is a need therefore for an improved method of power control in a wireless communication system supporting multiple data streams via a common link. Further, there is a need for a wireless communication system supporting multiple users via a common link that considers the quality of the common link with respect to each mobile user.

SUMMARY

The disclosed embodiments provide a novel and improved method for power control in a wireless communication system. According to one aspect, in a wireless communication system wherein multiple data streams are transmitted via a composite channel, the composite channel including a plurality of transport channels, a method for power control includes assigning a power indicator to each of the plurality of transport channels, decrementing the power indicator of each of the plurality of transport channels having a transmission error, incrementing the power indicator of each of the plurality of transport channels without a transmission error, determining a maximum power indicator from the power indicators of each of the plurality of transport channels, and making a power control decision based on the maximum power indicator.

In another aspect, a method for power control in a wireless communication system, wherein transmissions in the system use a composite transport channel having a plurality of transport channels, includes receiving data streams via the plurality of transport channels, determining an individual quality threshold for each of the plurality of transport channels, and determining a composite quality threshold for the composite transport channel, wherein the composite quality threshold is equal to a maximum of the individual quality thresholds.

In still another aspect, a wireless apparatus includes a processor operative to process multiple data streams, wherein the multiple data streams are received via a plurality of transport channels, an error detection unit coupled to the processor, the error detection unit operative to detect errors in the multiple data streams, and a power control unit adapted to calculate quality thresholds for each of a plurality of transport channels, wherein a first quality threshold associated with a first transport channel is increased on detection of an error in a first data stream transmitted via the first transport channel, wherein the power control unit is adapted to determine a power control instruction according to the quality thresholds.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In an exemplary embodiment of the present invention, a CDMA wireless communication system implements a closed loop power control method, wherein multiple instances of the outer loop are performed in parallel. The method determines a Signal-to-Interference Ratio (SIR) threshold based on the cyclical redundancy checking criteria over the parallel instances.

Figure 1:
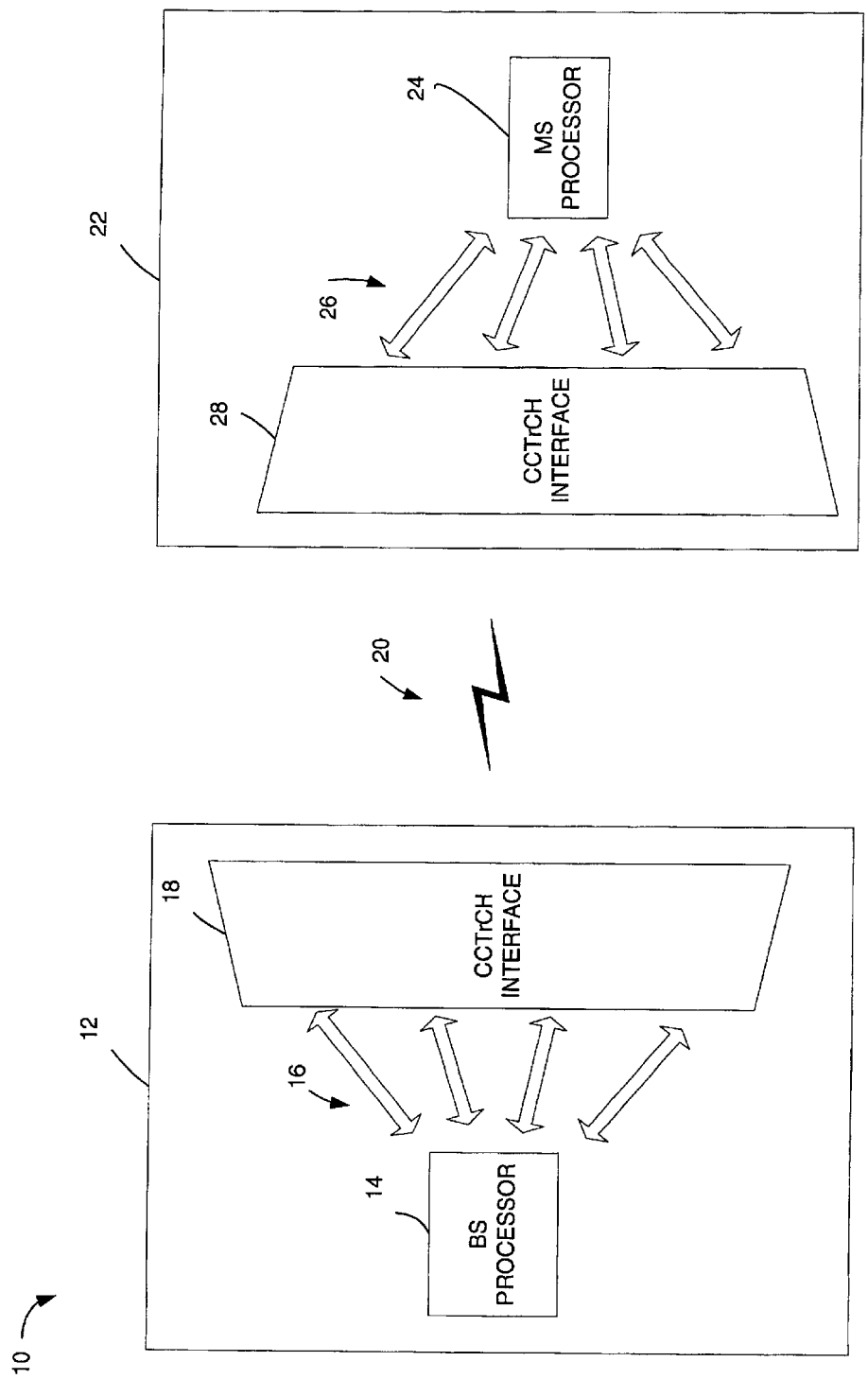
FIG. 1 illustrates in block diagram form a wireless communication system according to one embodiment.

In an exemplary embodiment illustrated in FIG. 1, a wireless communication system 10 includes a base station 12 that communicates with mobile station 22 via an air interface, radio link 20. The base station 10 processes separate multiple transport channels each corresponding to a data stream to mobile station 22. A transport channel is a channel for transporting data between the physical channel and a given destination. A transport channel, from the transmitter point of view, is a channel that connects the higher-layer logical channel to the allocated bits on the physical channel. When the higher-layer bits pass through a transport channel, they are appended with CRC bits, encoded, and rate-matched. Different types of transport channels are defined by how and with which characteristics data are transferred on the physical layer, whether using dedicated or common physical channel. The transport channels are multiplexed to form a Coded Composite Transport Channel, referred to as (CCTrCH). A CCTrCH is, therefore, the result of multiplexing one or several transport channels. The data streams are provided via the transport channels 16 to the CCTrCH interface 18, which is further detailed in FIG. 2. The CCTrCH prepares the data streams for transmission over the radio link 20.

Note that in the exemplary embodiment, system 10 is a Code Division Multiple Access (CDMA) wireless system, consistent with "ANSI J-STD-01 Draft Standard for W-CDMA (Wideband Code Division Multiple Access) Air Interface Compatibility Standard for 1.85 to 1.99 GHz PCS Applications" referred to as "W-CDMA" or "WCDMA." In alternate embodiments, the system 10 may be implemented using a system consistent with the "TIA/EIA/IS-2000 Standards for cdma2000 Spread Spectrum Systems" referred to as "the cdma2000 standard," the "TIA/EIA/IS-95 Mobile Station-Base Station Compatibility Standard for Dual-Mode Wideband Spread Spectrum Cellular System," hereinafter referred to as "the IS-95 standard," or other systems employing power control, such as the systems generally referred to as High Data Rate (HDR) systems. Mobile station 22 includes a processor 24 and a CCTrCH interface 28, similar to CCTrCH interface 18. Transport channels 26 are used to process data streams between CCTrCH interface 28 and processor 24.

Figure 2:
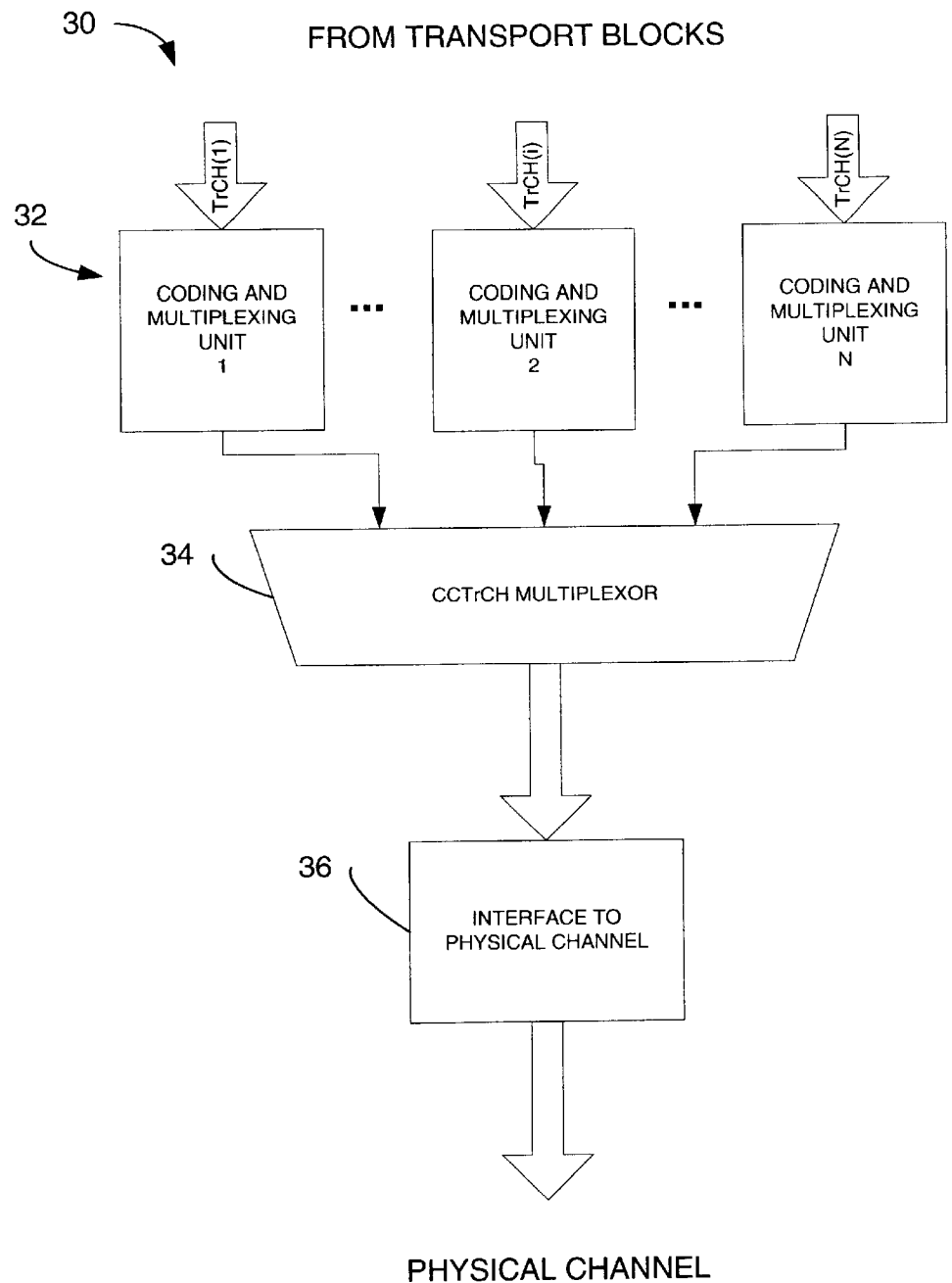
FIG. 2 illustrates in block diagram form a portion of a traffic channel as in FIG. 1 according to one embodiment.

A portion 30 of the CCTrCH interface 18 of FIG. 1 is detailed in FIG. 2. As illustrated, the transport channels provide data streams to coding and multiplexing units 32. For clarity in FIG. 2, each one of the coding and multiplexing units 32 is assigned an index corresponding to a transport channel. The coding and multiplexing units are coupled to a CCTrCH multiplexor 34 wherein the information of the transport channels is multiplexed and provided to an interface unit 36 that which prepares data for and presents data to the physical channel, radio link 20 of FIG. 1.

Figure 3:
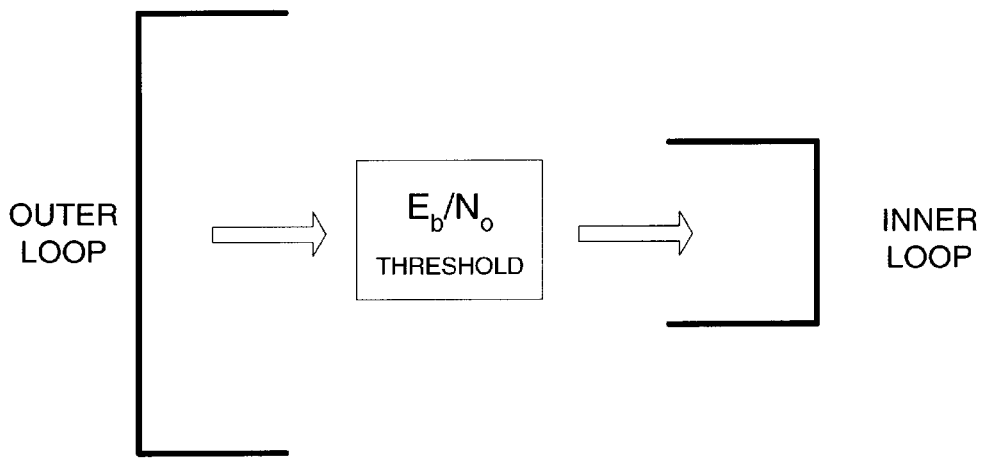
FIG. 3 illustrates a power control scheme implemented in a wireless communication system of one embodiment.

Referring again to the wireless system 10 of FIG. 1, the mobile station 22, as well as other mobiles not shown, is typically moving within system 10 with respect to base station 12. Generally, reverse link power control ensures that the base station 12 does not receive excessive power from a proximate mobile unit compared to a distant unit, i.e., seeks to solve the near-far problem. In the exemplary embodiment, system 10 employs a closed loop power control scheme that is illustrated in FIG. 3. The closed loop scheme includes an outer loop and an inner loop for controlling transmit power based on a link quality metric. An inner loop periodically compares received signals to a threshold value. The threshold value is related to a link quality metric and usually represents a ratio of signal energy to noise energy. The outer loop initializes and periodically updates the threshold value.

The period of the outer loop is typically much larger than the period of the inner loop. Power control decisions are made in response to results of the comparison. The power control decisions are then provided to the corresponding transmitter as power control instructions. The transmitter responds to the instructions by adjusting transmit power accordingly. In one embodiment, a power control instruction is sent as the Transmit Power Control (TPC) bits defined in the physical channel structure. In another embodiment, a power control instruction is transmitted as Power Control Bit (PCB) inserted in the CCTrCH transmission. The assertion of the TPC or PCB instructs the recipient to increase power and negation of the bit instructs the recipient to decrease power. Note that assertion and negation are relative terms wherein if assertion is a high logical level, negation is a low logic level and vice versa. The TPC (PCB) bit provides an increase/decrease instruction wherein the polarity of the assignment may be implemented in a variety of ways. Alternate embodiments may use alternate methods to instruct the recipient on power adjustment. For example, one embodiment transmits the instructions using an alternate channel.

In the exemplary embodiment, the PCB indicates an incremental increase or decrease wherein the increment is a predetermined power adjustment step. The power adjustment step may be the same for increases and decreases or may be different. Also, in the exemplary embodiment, the power adjustment step is defined as a dB power step. Another embodiment utilizes multiple PCBs to provide an indication of the power adjustment step size and direction.

As illustrated in FIG. 3, the threshold value is set to a value as a function of a link quality metric, wherein the link quality metric is defined as energy per chip ($E_c$) per noise power density ($N_0$), or $$\frac{E_c}{N_0}.$$

As $E_c$ is related to the average modulating signal power, the metric $$\frac{E_c}{N_0}$$

is related to the received Signal-to-Interference Ratio (SIR). Therefore, the value $$\frac{E_c}{N_0}$$

provides a link quality metric that directly responds to the power control command. Alternate embodiments may implement other metrics that serve as indications of link quality.

Figure 4:
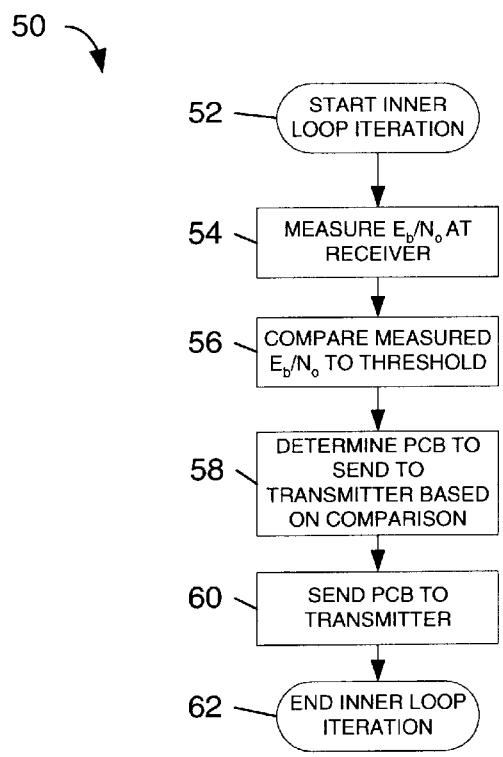
FIG. 4 illustrates an inner loop of a power control scheme as in FIG. 3 according to one embodiment.

FIG. 4 illustrates, in flow diagram form, a process flow 50 for one iteration of the inner loop power control operation, according to the exemplary embodiment. The inner loop is part of the closed loop power control scheme of FIG. 3. Note that for the exemplary embodiment, the base station 10 and the mobile station 22 of FIG. 1 perform the inner loop and outer loop operations. The base station 10 measures $\frac{E_c}{N_0}$ of the reverse link and the mobile station 22 measures $\frac{E_c}{N_0}$ of the forward link. The base station 10 then sends power control instructions to the mobile station 22, and the mobile station 22 sends power control instructions to the base station 10. Alternate embodiments may perform the closed loop power control operation at one instead of both participants of the transmission.

Continuing with FIG. 4, the iteration starts at step 52 and measures the $\frac{E_c}{N_0}$ of the received signal at step 54. The measured $\frac{E_c}{N_0}$ is compared to the threshold at step 56. The threshold is a quality threshold and may be considered a power indicator. At step 58 the receiver determines the PCB(s) to send to the transmitter based on results of the comparison of step 56. The receiver then sends the PCB(s) to the transmitter at step 60 and ends the iteration at step 62. Note that each receiver continuously monitors the link metric $\frac{E_c}{N_0}$.

While the inner loop operation illustrated in FIG. 4 monitors the received signal quality, it cannot easily distinguish the link metric $\frac{E_c}{N_0}$ for each transport channel within the CCTrCH. (The exemplary embodiment uses the outer loop operation to distinguish between the individual transport channels making up the CCTrCH.

The outer loop operation of the exemplary embodiment uses a metric that is related to the transmission error rate of each transport channel. The exemplary embodiment uses the Cyclic Redundancy Check (CRC) as a metric for updating the threshold value. Note that the constituent transport channels of the CCTrCH may be coded using a variety of error-control codes, wherein individual transport channels result in different block error probabilities. The transmission error rate metric individualizes the analysis of channel performance. Note that the error probability target, $\epsilon$, may vary from transport channel to transport channel.

For the case of a single transport channel, having a block error probability target of $\epsilon$, the CRC metric may be implemented according to the following power control scheme:

if (CRC fail)→Increment target SIR by $\Delta$;    (1)

if (CRC pass) → Decrement target SIR by $\frac{\varepsilon}{1-\varepsilon}\Delta$.    (2)

The target SIR corresponds to the threshold power level for the transport channel. The CRC check is performed at the receiver (base station 10 or mobile station 22). In other words, the absence of CRC errors indicates that the SIR threshold was likely set too high. In this case, the threshold may be decremented. The presence of CRC errors indicates that the SIR target may be set too low and the SIR target should be incremented accordingly. In steady state, the target SIR will be adjusted such that the block error probability results in $\epsilon$.

Figure 5:
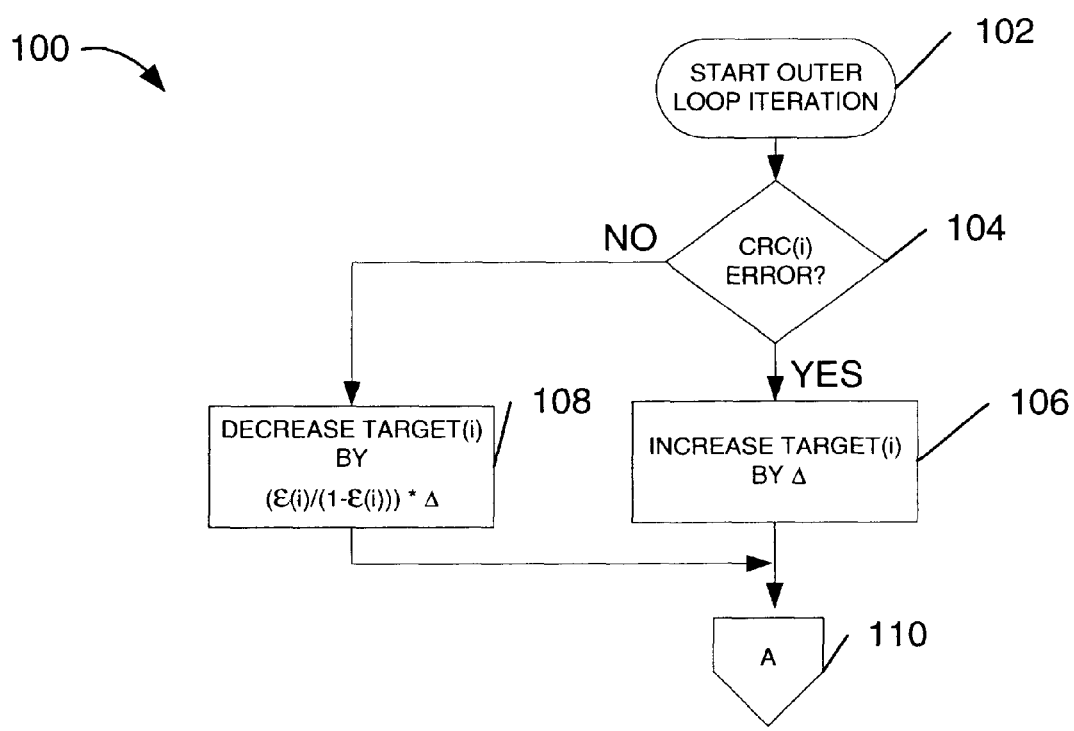
FIGS. 5 and 6 illustrate an outer loop of a power control scheme as in FIG. 3 according to one embodiment.
Figure 6:
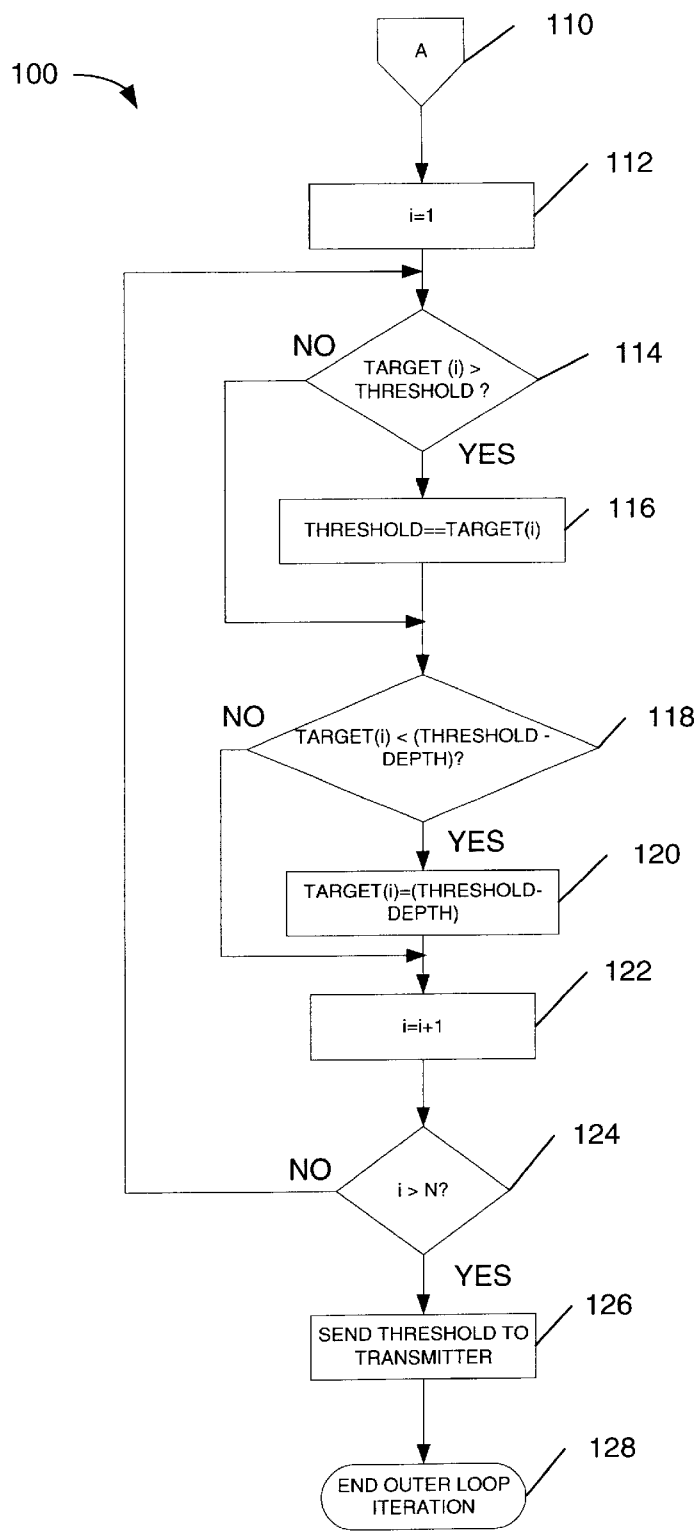

For multiple transport channels within the CCTrCH, the transmit power per chip is adjusted for all transport channels together. An iteration 100 of the outer loop operation of the exemplary embodiment is illustrated in FIGS. 5 and 6. At step 102 the outer loop iteration begins. At decision diamond 104 the receiver checks for CRC errors in transport channel (i), wherein the CRC for transport channel(i) is identified as CRC(i). The index i corresponds to a transport channel. Each transport channel(i) has an associated TARGET(i) representing the threshold value for transport channel(i). The TARGET( ) values represent the individual threshold values. If there is no CRC error on transport channel (i), processing continues to step 108 to decrease the TARGET(i) according to a predetermined formula. If there is a CRC error on transport channel (i), processing continues to step 106 to increase TARGET(i) by a predetermined amount. The exemplary embodiment, implements the CRC metric extending the above power control scheme to individual transport channels:

if (CRC fail)→Increment TARGET(i) by $\Delta(i)$;    (3)

if (CRC pass) → Decrement TARGET(i) by $\frac{\varepsilon(i)}{1-\varepsilon(i)}\Delta(i)$.    (4)

The initial values of TARGET( ) are predetermined independently for each transport channel. The maximum of all the individual TARGET(i) for i=1, 2, . . . , N is employed as the SIR target for the CCTrCH, as this value will satisfy the block error probability target of each transport channel in steady state. In steady state equations (3) and (4) guarantee that the error probability is $\epsilon(i)$. For example, if from the start the SIR target is 100 dB lower than expected, then after 100 block errors the SIR target will still be at least 100–100*$\Delta$ lower than the required value. Therefore, all 100 blocks will probably be in error, leading to an error rate of 1. As all of the individual transport channels within the CCTrCH utilize a common channel for transmission, the quality of the CCTrCH reflects the transport channel experiencing the worst quality. In other words, the transmit power is adjusted to satisfy the worst performing transport channel.

Note that alternate embodiments may increment and decrement by a same amount or use a same formula. Alternate embodiments may use predetermined values for increment and decrement. From steps 108 and 106, processing continues in FIG. 6. Note that in one embodiment the CRC error check of decision diamond 104, and the resultant increment at step 106 or decrement at step 108, is performed in parallel for i=1, 2, . . . , N, wherein N is the total number of transport channels within CCTrCH. The CRC metric provides individual threshold values for each transport channel. Iteration 100 continues from step 110 in FIG. 6. at step 112 the transport channel index i is initialized to 1. At decision diamond 114 the receiver determines if TARGET(i), the individual threshold value of transport channel(i), is greater than the CCTrCH threshold value, labeled "THRESHOLD." If the TARGET(i) is greater than THRESHOLD, then THRESHOLD is set equal to the value of TARGET(i) at step 116. Processing continues to decision diamond 118 to determine if TARGET(i) is less than THRESHOLD less a range value, labeled "DEPTH." DEPTH prevents any TARGET(i) from departing too greatly from the current THRESHOLD value. If the TARGET(i) is greater then it is set equal to (THRESHOLD-DEPTH) at step 120. This prevents the case where a transport channel(j) requires the THRESHOLD value that dominates all the other transport channels. In this case, the other transport channels will not experience many CRC errors, and therefore, on each iteration of the outer loop the individual TARGET values associated with the other transport channels will continue to decrement. If another transport channel replaces transport channel(j) as the limiting channel, it many take many iterations for the decremented TARGET values to return to an appropriate level with respect to the current limiting THRESHOLD, resulting in the loss of transport blocks. The use of a range value, such as DEPTH, diminishes the loss of data in such a scenario. [Can you please show me the origin of this paragraph? It seems to be a completely different idea from what I had.]

Processing continues to step 122 where the index i is incremented. At decision diamond 124 the receiver determines if all transport channels within the CCTrCH have been considered. If not, processing returns to decision diamond 114. If all transport channels have been considered, processing continues to step 126 to send the THRESHOLD value to the transmitter. Iteration 100 of the outer loop ends at step 128.

In one example, the system desires to maintain a block error rate of 1%, i.e., ($\epsilon$=0.01). Furthermore, the increment step, $\Delta$, is set to 0.5. The values TARGET(i) for i=1, . . . , N are first initialized. The outer loop performs a CRC check for each transport channel(i), and the results processed as follows:

if (CRC fail)→Increment TARGET(i) by 0.5; (5)

if (CRC pass)→Decrement TARGET(i) by (0.5/99). (6)

The maximum is determined from the N transport channels and the THRESHOLD value is set equal to the maximum value. Using these values, the average block error rate is found empirically to be approximately 1%. Alternate examples and embodiments may implement other block error probability targets, as well as alternate methods of computing the increment and/or decrement values.

Figure 7:
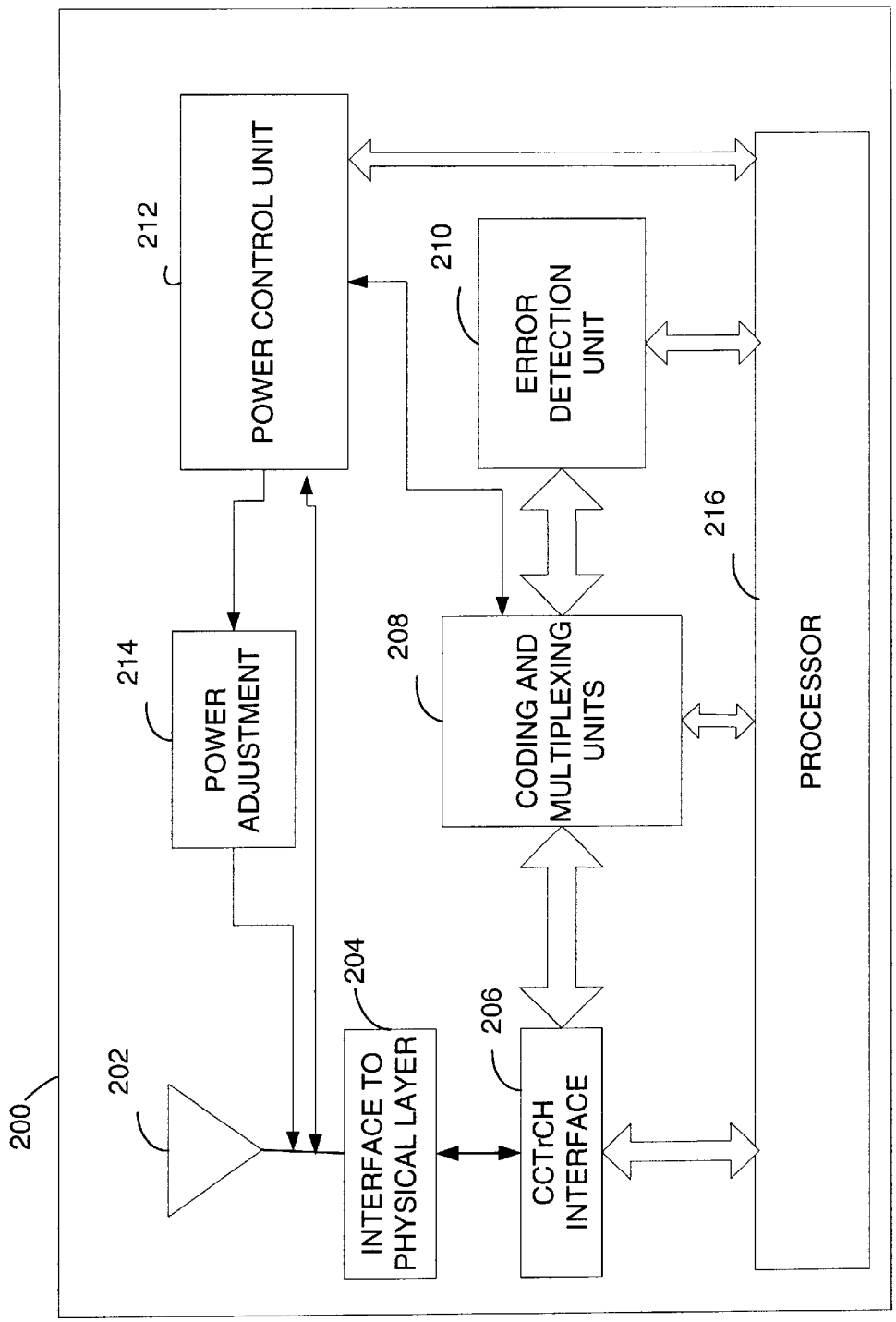
FIG. 7 illustrates a transmitter in a wireless communication system as in FIG. 1 according to an exemplary embodiment.

FIG. 7 illustrates a transceiver 200, such as mobile station 22 and/or base station 12 of FIG. 1, according to one embodiment. The transceiver 200 includes an antenna 202, coupled to an interface to the physical layer 204. A CCTrCH interface processes the composite transport channel and is coupled to the interface 204, the processor 216, and the coding and multiplexing units 208. Coding and multiplexing units 208 process the data streams of the transport channel supported. The coding and multiplexing units 208 are further coupled to the error detection unit 210 and the processor 218. Further, the coding and multiplexing units 208 provide power control instructions to the power control unit 212, wherein the power control instructions are received by the transceiver 200. In response to the power control instructions, the power control unit 212 sends a signal to the power adjustment 214 coupled to the antenna 202. The power adjustment 214 includes an amplifier for adjusting the signals transmitted from the transceiver 200.

Power control processing within transceiver 200 includes two parts, wherein a first part adjusts the transmit power of transceiver 200 in response to power control instructions received as feedback from a device(s) that is a recipient(s) of signals from transceiver 200. The second part of the power control processing is to provide feedback to other device(s) from which transceiver 200 receives signals. In other words, transceiver 200 provides feedback to transmitters and receives feedback from receivers. The processor 216 receives the results of the CRC check for each transport channel from error detection unit 210. From the CRC( ) information, the processor 216 calculates and stores a TARGET( ) for each one. The TARGET( ) represents a channel quality metric threshold for each transport channel. If the CRC fails, more transmit power is needed for the associated transport channel, and therefore the corresponding TARGET( ) value is increased. If the CRC passes, there may be excess power used for the associated transport channel, and therefore the corresponding TARGET( ) value is decreased. The processor 216 then determines a CCTrCH or composite transport channel threshold value based on the individual TARGET( ) values. The composite transport channel threshold value in one embodiment is the maximum of all the TARGET( ) values.

Thus, a novel and improved method and apparatus for transmit power control in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system wherein multiple data streams are transmitted via a composite channel, the composite channel comprising a plurality of transport channels, a method comprising:
   assigning a power indicator to each of the plurality of transport channels;
   performing an outer loop computation having a first period, the outer loop, comprising:
      decrementing the power indicator of each of the plurality of transport channels having a transmission error;
      incrementing the power indicator of each of the plurality of transport channels without a transmission error; and
      determining a maximum power indicator from the power indicators of each of the plurality of transport channels;
   performing an inner loop computation having a second period, the inner loop computation, comprising:
      making a power control decision based on the maximum power indicator,
   wherein the first period is larger than the second period.

2. The method of claim 1, further comprising:
   detecting a transmission error in at least one of the plurality of transport channels.

3. The method of claim 2, wherein the detecting a transmission error further comprises:
   performing a cyclical redundancy check on each of the plurality of transport channels.

4. The method of claim 1, wherein the power indicators are signal-to-interference ratios.

5. The method of claim 1, further comprising:
   transmitting the power control decisions to a transmitter;
   wherein the transmitter adjusts the power in response to the power control decision.

6. The wireless apparatus performing the method of claim 1.

7. The method of claim 1, wherein:
   the decrementing applies a decrement step value; and
   the incrementing applies an increment step value different from the decrement step value.

8. The method of claim 7, wherein the decrement step value is a function of the increment step value.

9. The method of claim 8, wherein decrement step value applies a target error probability to the increment step size.

10. A method for power control in a wireless communication system, wherein transmissions in the system use a composite transport channel comprising a plurality of transport channels, comprising:
    receiving data streams via the plurality of transport channels;
    performing an outer loop computation having a first period, the outer loop computation comprising:
       determining an individual quality threshold for each of the plurality of transport channels; and
       determining a composite quality threshold for the composite transport channel,
       wherein the composite quality threshold is equal to a maximum of the individual quality thresholds; and
    performing an inner loop having a second period, the inner loop computation comprising:
       making a power control decision based on the composite quality threshold;
    wherein the first period is larger than the second period.

11. The method of claim 10, further comprising:
    updating the individual quality thresholds as a function of transmission errors on each of the plurality of transport channels.

12. The method of claim 11, further wherein the individual quality thresholds are maintained within a predetermined range of the composite quality threshold.

13. The method of claim 11, further comprising:
    performing a cyclical redundancy check for each of the plurality of transport channels.

14. The method of claim 10, wherein a transmitter uses the composite quality threshold to make power control decisions.

15. A wireless apparatus, comprising:
    a processor operative to process multiple data streams, wherein the multiple data streams are received via a plurality of transport channels;
    an error detection unit coupled to the processor, the error detection unit operative to detect errors in the multiple data streams; and
    a power control unit adapted to perform an outer loop having a first period, the outer loop comprising calculating quality thresholds for each of a plurality of transport channels, wherein a first quality threshold associated with a first transport channel is increased on detection of an error in a first data stream transmitted via the first transport channel, wherein the power control unit is adapted to perform an inner loop having a second period to determine a power control instruction according to the quality thresholds, wherein the first period is larger than the second period.

16. The wireless apparatus of claim 15, wherein the power control unit is adapted to decrease the first quality threshold if no error is detected.

17. The wireless apparatus of claim 16, wherein quality threshold decrease steps are a function of block error probability.

18. The wireless apparatus of claim 16, wherein quality threshold increase steps have a predetermined step size.

19. The wireless apparatus of claim 15, wherein the quality threshold corresponds to a signal-to-interference ratio.

20. The wireless apparatus of claim 19, wherein the power control unit is adapted to transmit a power control instruction to a transmitter.

21. In a wireless communication system wherein multiple data streams are transmitted via a composite channel, the composite channel comprising a plurality of transport channels, a method comprising:
    assigning a power indicator to each of the plurality of transport channels;

decrementing the power indicator of each of the plurality of transport channels having a transmission error;

incrementing the power indicator of each of the plurality of transport channels without a transmission error;

determining a maximum power indicator from the power indicators of each of the plurality of transport channels;

making a power control decision based on the maximum power indicator;

wherein the decrementing applies a decrement step value;

the incrementing applies an increment step value different from the decrement step value; and wherein the decrement step value is a function of the increment step value.

22. The method of claim 21, wherein decrement step value applies a target error probability to the increment step size.

23. A method for power control in a wireless communication system, wherein transmissions in the system use a composite transport channel comprising a plurality of transport channels, comprising:

receiving data streams via the plurality of transport channels, determining an individual quality threshold for each of the plurality of transport channels;

determining a composite quality threshold for the composite transport channel, wherein the composite quality threshold is equal to a maximum of the individual quality thresholds, updating the individual quality thresholds as a function of transmission errors on each of the plurality of transport channels, wherein the individual quality thresholds are maintained within a predetermined range of the composite quality threshold.

24. A wireless apparatus, comprising:

a processor operative to process multiple data streams, wherein the multiple data streams are received via a plurality of transport channels;

an error detection unit coupled to the processor, the error detection unit operative to detect errors in the multiple data streams; and a power control unit adapted to calculate quality thresholds for each of a plurality of transport channels, wherein a first quality threshold associated with a first transport channel is increased on detection of an error in a first data stream transmitted via the first transport channel, wherein the power control unit is adapted to determine a power control instruction according to the quality thresholds, wherein the power control unit is adapted to decrease the first quality threshold if no error is detected, and wherein quality threshold decrease steps are a function of block error probability.

* * * * *